(12) United States Patent
Iritsuki et al.

(10) Patent No.: US 10,256,481 B2
(45) Date of Patent: Apr. 9, 2019

(54) SEAL STRUCTURE FOR FUEL CELL

(71) Applicant: NISSAN MOTOR CO., LTD., Yokohama-shi, Kanagawa (JP)

(72) Inventors: Keita Iritsuki, Kanagawa (JP); Takao Izumi, Kanagawa (JP)

(73) Assignee: NISSAN MOTOR CO., LTD., Yokohama-shi (JP)

(*) Notice: Subject to any disclaimer, the term of this patent is extended or adjusted under 35 U.S.C. 154(b) by 0 days.

(21) Appl. No.: 15/743,397

(22) PCT Filed: Jul. 13, 2015

(86) PCT No.: PCT/JP2015/070048
§ 371 (c)(1),
(2) Date: Jan. 10, 2018

(87) PCT Pub. No.: WO2017/009935
PCT Pub. Date: Jan. 19, 2017

(65) Prior Publication Data
US 2018/0212260 A1    Jul. 26, 2018

(51) Int. Cl.
*H01M 8/0276* (2016.01)
*H01M 8/0284* (2016.01)
*H01M 8/2465* (2016.01)
*H01M 8/0267* (2016.01)
(Continued)

(52) U.S. Cl.
CPC ....... *H01M 8/0276* (2013.01); *H01M 8/0267* (2013.01); *H01M 8/0284* (2013.01); *H01M 8/2432* (2016.02); *H01M 8/2465* (2013.01); *H01M 2008/1293* (2013.01)

(58) Field of Classification Search
CPC . H01M 8/0276; H01M 8/2465; H01M 8/0284
See application file for complete search history.

(56) References Cited

U.S. PATENT DOCUMENTS

2004/0086769 A1* 5/2004 Diez ................ H01M 8/0206
                                                          429/456
2009/0155671 A1   6/2009 Reytier et al.
2011/0318665 A1  12/2011 Yamamoto et al.

FOREIGN PATENT DOCUMENTS

EP     2 360 761 A1     8/2011
JP     61-164862 U1    10/1986
JP     2006-009984  *   1/2006
(Continued)

*Primary Examiner* — Lisa S Park
(74) *Attorney, Agent, or Firm* — Foley & Lardner LLP

(57) ABSTRACT

A support member includes a support portion that supports an electric power generation portion of a cell and a seal portion located outside the electric power generation portion and seals between adjacent cells. A seal structure includes outer-side and inner-side wall portions located between adjacent seal portions. The outer-side wall portion is located on a side of an outer circumference of one of the seal portions. The inner-side wall portion is located on another of the seal portions and on a side closer to the electric power generation portion than the outer-side wall portion. An elastic member is provided between the outer-side and inner-side wall portions, and presses the inner-side and outer-side wall portions in opposing directions. A seal member is provided between at least one of the outer-side wall portion and the elastic member, or the inner-side wall portion and the elastic member.

7 Claims, 4 Drawing Sheets

(51) Int. Cl.
*H01M 8/2432* (2016.01)
*H01M 8/124* (2016.01)

(56) References Cited

FOREIGN PATENT DOCUMENTS

| | | | |
|---|---|---|---|
| JP | 2006-292005 A | 10/2006 |
| JP | 2007-323984 A | 12/2007 |
| JP | 2009-144246 A | 7/2009 |
| JP | 5113350 B2 | 1/2013 |
| WO | WO 2010/100906 A1 | 9/2010 |

* cited by examiner

SEAL STRUCTURE FOR FUEL CELL

TECHNICAL FIELD

The present invention relates to a seal structure for a solid oxide fuel cell in which plural cells are stacked.

BACKGROUND ART

In a Patent Literature 1 listed below, disclosed is a seal structure for achieving gas-sealing between cells on an outer circumferential side of an electric power generation portion including an electrolyte, a fuel electrode and an air electrode in a solid oxide fuel cell that is configured by stacking plural cells with separators interposed therebetween.

In the seal structure of the Patent Literature 1, depressed portions and protruded portions that mesh with each other at a portion on the outer circumferential side from the electric power generation portion are provided between separators adjacent to each other, and a bitten thin sheet are disposed between the depressed portions and protruded portions. On both surfaces of the bitten thin sheet, glass seal pastes are pasted.

In this case, even if a dimension of a cell(s) or the like decreases when the fuel cell is operated for a long time under a high temperature environment, the bitten thin sheet gradually deforms by being pushed by the depressed portions and the protruded portions due to a force generated at that time, and thereby a gas seal performance can be ensured.

CITATION LIST

Prior-art Literature

Patent Literature 1: Japanese Granted Patent Publication No. 5113350 (see paragraphs 0044 to 0055, FIG. 6 to FIG. 8 and so on).

SUMMARY OF INVENTION

Problems to be Solved by Invention

According to the above prior-art seal structure, the bitten thin sheet absorbs, by its deformation, displacement of the cell(s) in its stacking direction, but it is difficult to absorb a displacement in a direction along a plane of the electric power generation portion perpendicular to the stacking direction of the cell(s). Therefore, the glass seals pasted on the both surfaces of the bitten thin sheet tends to be damages easily due to a force (shearing force) caused by the displacement in the direction along the plane of the electric power generation portion, and thereby the seal performance may degrade.

Therefore, the present invention intends to ensure a seal performance with respect to a displacement in a direction along a plane of an electric power generation portion.

Means for Solving Problems

In the present invention, between seal portions adjacent to each other, provided are an outer-side wall portion located on an outer circumferential side of one of the seal portions and an inner-side wall portion located, on another of the seal portions, closer to a side of an electric power generation portion than the outer-side wall portion. An elastic member is provided between the outer-side wall portion and the inner-side wall portion, and a seal member is provided between at least one of the outer-side wall portion and the inner-side wall portion and the elastic member.

Effects by Invention

According to the present invention, the elastic member provided between the outer-side wall portion and the inner-side wall portion absorbs a displacement of the cell(s) in a direction along a plane of the electric power generation portion by elastically deforming so as to compress the seal member. Therefore, the seal member receives a force in a compressive direction but prevents from receiving a force in a shearing direction, and thereby it can be restricted from being damaged and its seal performance can be ensured.

DESCRIPTION OF EMBODIMENTS

Hereinafter, embodiments for carrying out the present invention will be described in detail with reference to the drawings.

Figure 1:
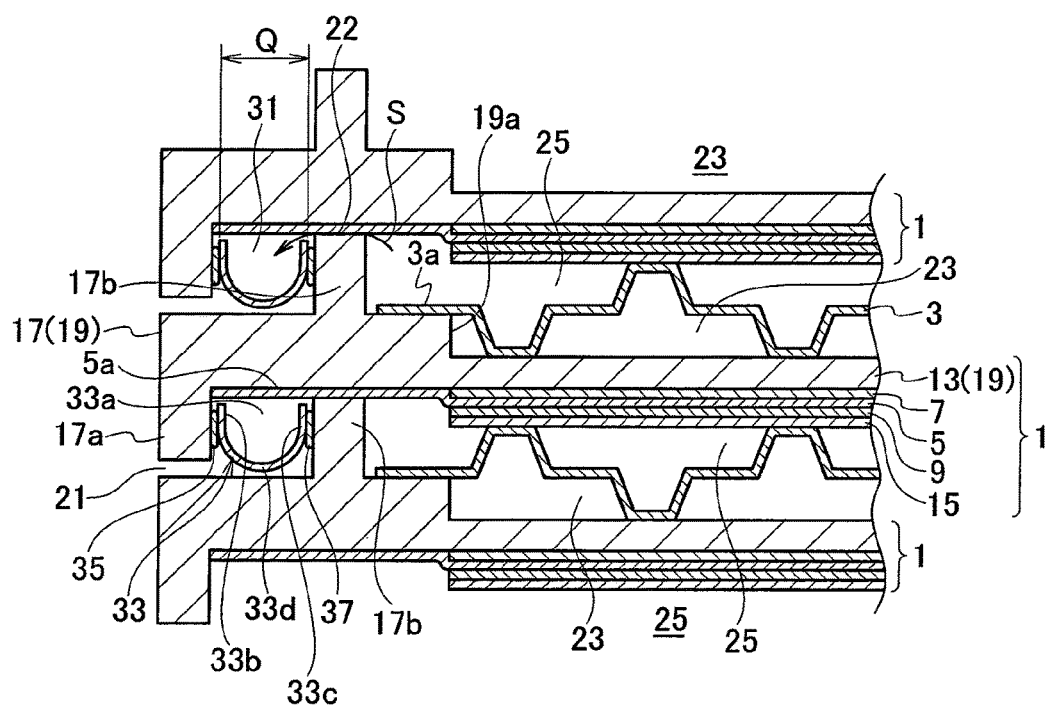
FIG. 1 is a partial cross-sectional view of a solid oxide fuel cell according to a first embodiment of the present invention, and corresponds to a cross-section taken along A-A in FIG. 2.

A solid oxide fuel cell according to a first embodiment shown in FIG. 1 is made as a stack by stacking plural cells 1 in a vertical direction in FIG. 1 with separators 3 interposed therebetween, and its portion in its stack direction is shown. FIG. 1 shows an end on its left side in FIG. 2, but a vicinity of an end on its right side in FIG. 2 has a symmetrical structure thereto.

The cell 1 includes a solid electrolyte 5, a fuel electrode 7 provided on one side (an upper side in FIG. 1) of the solid electrolyte 5, an air electrode 9 provided on another side (a lower side in FIG. 1) of the solid electrolyte 5, and a support member 19 provided on an opposite side (an upper side in FIG. 1) of the fuel electrode 7 to a side where the electrolyte 5 is provided. An area where the fuel electrode 7 and the air electrode 9 are formed on both sides of the solid electrolyte 5, respectively, turns to be an electric power generation portion.

In the area including the electric power generation portion, provided is a support portion 13 of the support member 19 that is configured of a porous layer through which a fuel gas flows to a side of the fuel electrode 7, and provided is an electrically collective supplemental layer 15 through which an air flows to a side of the air electrode 9. The support portion 13 corresponds to one that supports the electric power generation portion, and configures the support member 19 together with a seal portion 17 that is configured of a dense layer located on an outer circumferential side of the support portion 13. The support member 19 is configured of metal, ceramic or the like. The support portion 13 and the seal portion 17 have an integrated structure, but may have a structure in which they are independent members from each other and jointed with each other.

With respect to the support portion 13 of the support member 19, the fuel gas to be supplied to a side of the fuel electrode 7 passes through a large number of its small holes to bring it to the fuel electrode 7. The seal portion 17 of the support member 19 has a dense structure through which the fuel gas cannot pass. The support member 19 formed by integrating the support portion 13 and the seal portion 17 is made by making its entire as a porous layer at first, and then apply pressures only to a portion associating with the seal portion 17 to be compressed to form the dense layer.

The seal portion 17 on the outer side in the direction along the plane of the electric power generation portion is thicker in the stacking direction of the cells 1 than the support portion 13 located in the electric power generation portion so as to protrude its side on the air electrode 9 toward an upper side in FIG. 1. Namely, the support member 19 that has the support portion 13 and the seal portion 17 includes a stepped portion 19a on a side of the air electrode 9.

The seal portion of the support member 19 is integrally formed with its lower protruded portion 17a that is protruded downward in FIG. 1 at an end of its outer circumferential side, and is integrally formed with its upper protruded portion 17b that is protruded upward at a slightly inward circumferential side from the center position between the end of its outer circumferential side and an end of its inner circumferential side (a side of the electric power generation portion). The lower protruded portion 17a configures an outer-side wall portion, and the upper protruded portion 17b configures an inner-side wall portion. Namely, by stacking the plural cells 1 each of which includes the lower protruded portion 17a and the upper protruded portion 17b at the seal portion 17 of the support member 19, the lower protruded portion 17a formed on one of the seal portions 17 and the upper protruded portion 17b formed on the other of the seal portions 17 are located between the seal portions 17 adjacent to each other. Note that the lower protruded portion 17a and the upper protruded portion 17b may have a structure in which they are independent members and jointed with the seal portion 17.

The above-mentioned solid electrolyte 5 is extended to a position where its end almost contacts with the lower protruded portion 17a while contacting with a lower surface of the seal portion 17 of the support member 19, and thereby configures an electrical insulative layer 5a. Here, a protruded length of the upper protruded portion 17b is slightly longer than a protruded length of the lower protruded portion 17a.

Therefore, in a state where an end of the upper protruded portion 17b in one cell 1 contacts with the insulative layer 5a of the adjacent cell 1, a gap 21 is formed between an end of the lower protruded portion 17a of the adjacent cell 1 and the seal portion 17 of the one cell 1. A portion where the end of the upper protruded portion 17b contacts with the insulative layer 5a configures a butting portion 22 at which the support members 19 are butted with each other in a state where the plural cells 1 are stacked.

The separator 3 is disposed between the cells 1 in a state where protrusions and depressions are formed on its metal sheet. Therefore, a fuel gas flow passage(s) 23 is formed between the separator 3 and the support portion 13, and an air flow passage(s) 25 is formed between the separator 3 and the electrically collective supplemental layer 15.

An end 3a of the separator 3 on a left side in FIG. 1 is fixed with an upper surface of the seal portion 17 of the support member 19 by welding. An end of the separator 3 on a right side in FIG. 1 and each end thereof in directions perpendicular to a paper plane of FIG. 1 are also fixed with the upper surface of the seal portion 17 of the support member 19 by welding, similarly to the end 3a on the left side.

Figure 2:
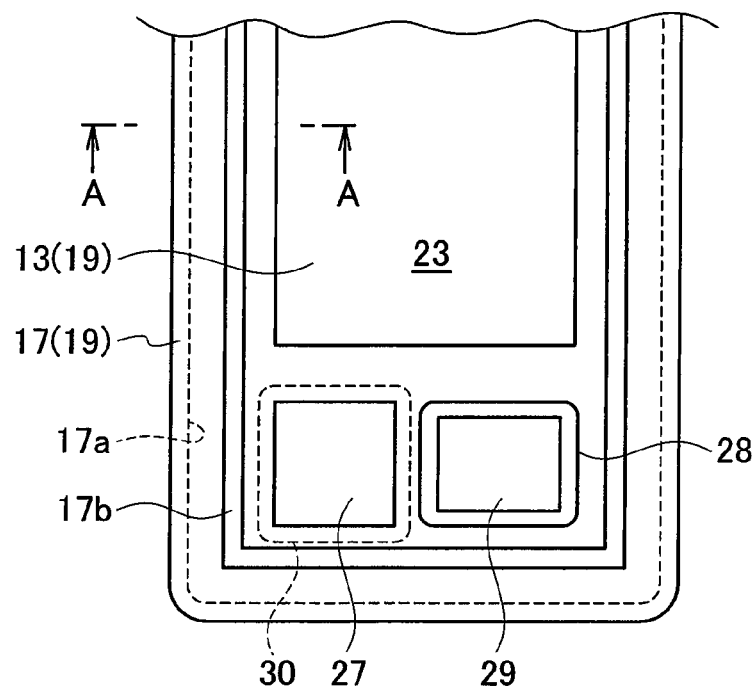
FIG. 2 corresponds to a diagram viewed from above in FIG. 1, and is a plan view showing a part of the fuel cell.

As shown in FIG. 2, in a vicinity of an end of the fuel cell on a lower side in FIG. 2, a distance between the upper protruded portion 17b of the seal portion 17 and the electric power generation portion at which the support portion 13 is provided is made wide. On the seal portion 17 where the distance is made wide, a fuel supply hole 27 and an air discharge hole 29 are provided. The fuel supply hole 27 and the air discharge hole 29 are provided on each of the stacked cells 1, and configure a fuel supply passage and an air discharge passage, respectively, that penetrate the fuel cell in the stacking direction of the cells 1.

In each cell 1, fuel flowing through the fuel supply passage is supplied from the fuel supply hole 27 to the fuel gas flow passages 23 on a front side of the support portion 13 of the support member 19 shown in FIG. 2. Unreacted superfluous air flowing through the air flow passages 25 in each cell 1 flows out through the air discharge hole 29, and then is discharged to the outside of the fuel cell through the air discharge passage.

A fuel discharge hole(s) that configures a fuel discharge passage and an air supply hole(s) that configures an air supply passage are provided on the seal portion 17 in a vicinity of another end, not shown in the drawing, of the fuel cell on an upper side in FIG. 2. A circumference, on a side of the fuel electrode 7 (paper front side in FIG. 2), of the air discharge hole 29 shown in FIG. 2 is sealed by a seal member 28 to prevent fuel from intruding. In addition, a circumference, on a side of the air electrode 9 (paper back side in FIG. 2), of the fuel supply hole 27 is sealed by a seal member 30 to prevent air from intruding. Circumferences of the fuel discharge hole and the air supply hole in the vicinity of the other end, not shown in the drawing, on the upper side in FIG. 2 are also sealed similarly.

The seal portion(s) 17 of the support member 19 is formed along an entire circumference of the fuel cell, and, along with this, the lower protruded portion(s) 17a and the upper protruded portion (s) 17b are also formed along the entire circumference of the fuel cell. Therefore, between the lower protruded portion 17a of one cell 1 and the upper protruded portion 17b of another cell 1 adjacent to the one cell 1 on a lower side in FIG. 1, a space 31 is formed along the entire circumference of the fuel cell.

An elastic member 33 is accommodated in the above-mentioned space 31. The elastic member 33 is disposed in the space 31 along the entire circumference of the fuel cell between the seal portions 17 adjacent to each other. The elastic member 33 is made of stainless steel, and manufactured by press-forming so as to have a U-shaped cross-sectional shape whose upper portion is opened as shown in FIG. 1.

Figure 3:
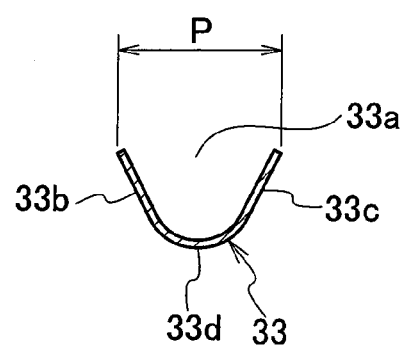
FIG. 3 is a cross-sectional view of an elastic member, before being assembled, used in a seal structure of the fuel cell shown in FIG. 1.

FIG. 3 shows the elastic member 33 before being assembled, and an open width P of an opened portion 33a formed at an upper portion of the elastic member 33 before being assembled is wider than an open width Q of the opened portion 33a formed at the upper portion of the elastic member 33 after being assembled (P>Q). In addition, in a state where the plural cells 1 are stacked, the opened portions 33a are located on the same side in the stacking direction of the cells 1 as that of the butting portions 22 where the support members 19 are butted with each other, i.e. on an upper side in FIG. 1.

The U-shaped elastic member 33 includes an outer plate portion 33b located on a side of the lower protruded portion 17a, an inner plate portion 33c located on a side of the upper protruded portion 17b, and a curved portion 33d connecting lower ends of the outer plate portion 33b and the inner plate portion 33c with each other. Each end (upper end), on a side of the opened portion 33a, of the outer plate portion 33b and the inner plate portion 33c is slightly distanced from the solid electrolyte 5. A lower end of the curved portion 33d is slightly distanced from the seal portion 17.

A glass seal 35 that serves as a seal member is provided between the outer plate portion 33b and the lower protruded portion 17a. Similarly, a glass seal 37 that serves as a seal member is provided between the inner plate portion 33c and the upper protruded portion 17b. Both of the glass seals 35 and 37 are disposed along the entire circumference of the fuel cell.

The elastic member 33 elastically presses the lower protruded portion 17a by its outer plate portion 33b via the glass seal 35. Similarly, the elastic member 33 elastically presses the upper protruded portion 17b by its inner plate portion 33c via the glass seal 37.

In a case where the support member 19 is made of an electrically conductive material such as stainless steel, the glass seals 35 and 37 are configured of an electrically insulative member. Here, it is sufficient that at least one of the left and right two glass seals 35 and 37 is made of an electrically insulative member.

In a case where the support member 19 or the elastic member 33 is made of an electrically non-conductive material, it is not needed that the glass seals 35 and 37 are configured of an electrically insulative member. In short, it is sufficient that the adjacent cells 1 are made electrically insulated with each other.

Functions will be described next.

The elastic member 33 before being assembled shown in FIG. 3 is accommodated in the space 31 between the lower protruded portion 17a of the upper-side cell 1 and the upper protruded portion 17b of the lower-side cell 1 in FIG. 1 between the adjacent cells 1 to each other when being assembled in the fuel cell as shown in FIG. 1.

Since the open width P of the elastic member 33 is made wide in a state before being assembled, the outer plate portion 33b and the inner plate portion 33c press the lower protruded portion 17a and the upper protruded portion 17b via the glass seals 35 and 37, respectively, after being assembled. Therefore, a portion between the air flow passages 25 on a side of the electric power generation portion and the outside of the fuel cell is sealed.

The elastic member 33 can apply forces in compressive directions to the glass seals 35 and 37 just after being assembled, because its open width P is made wide before being assembled. Further, even if displacements, in a direction along a plane of the electric power generation portion, of components of the fuel cell caused by differences of their thermal dilatations occur so as to widen a distance between the lower protruded portion 17a and the upper protruded portion 17b while the fuel cell is operated, the glass seals 35 and 37 can keep their compressed state due to the widened open width P before being assembled.

In the present embodiment, even if displacements, in a direction along a plane of the electric power generation portion, of components of the fuel cell caused by differences of their thermal dilatations occur during electric power generation (operation), a compressive stress applies to the glass seals 35 and 37 and thereby a shearing stress can be restricted from applying thereto. A brittle material such as the glass seals 35 and 37 tends to be broken due to expansions of cracks caused by an expansion stress or a shearing stress, but has characteristics of hardly being broken by a compressive stress.

Therefore, the glass seals 35 and 37 that receive a compressive stress as in the present embodiment can restrict from being damaged, and thereby reliability of their sealing function as a seal structure can be enhanced. In addition, the glass seals 35 and 37 don't construct a structure for achieving sealing function by being pressed onto the solid electrolyte 5 (the electrical insulative layer 5a). Therefore, even if the glass seal 35 or 37 is damaged, cracks starting from its damaged portion of the glass seal 35 or 37 can be restricted from expanding to the solid electrolyte 5 (the electrical insulative layer 5a).

In the present embodiment, the elastic member 33 is configured of a plate material(s), and includes the outer plate portion 33b that presses the lower protruded portion 17a, the inner plate portion 33c that presses the upper protruded portion 17b, and the curved portion 33d that bridges the outer plate portion 33b and the inner plate portion 33c.

In this case, the elastic member 33 that has a simple shape with an almost U-shaped whose cross-sectional shape formed by the outer plate portion 33b, the inner plate portion 33c and the curved portion 33d surely presses the glass seals 35 and 37 in their compressive directions to achieve sealing.

In the present embodiment, the opened portion 33a of the elastic member 33 formed on an opposite side to the curved portion 33d is located on the same side in the stacking direction of the cells 1 as that of the butting portions 22 where the support members 19 are butted with each other.

In this case, when a pressure in the air flow passage(s) 25 becomes high and then air flows out, as shown by an arrow S, to a side of the space 31 through a minute gap at the butting portion 22, a pressure of the air applies to the inside of the U-shape of the elastic member 33. Namely, the pressure within the space 31 applies in directions so as to press the outer plate portion 33b and the inner plate portion 33c onto the glass seals 35 and 37, respectively.

Therefore, it becomes possible to press the glass seals 35 and 37 effectively in their compressive directions, and thereby reliability of their sealing function can be enhanced further.

Figure 4:
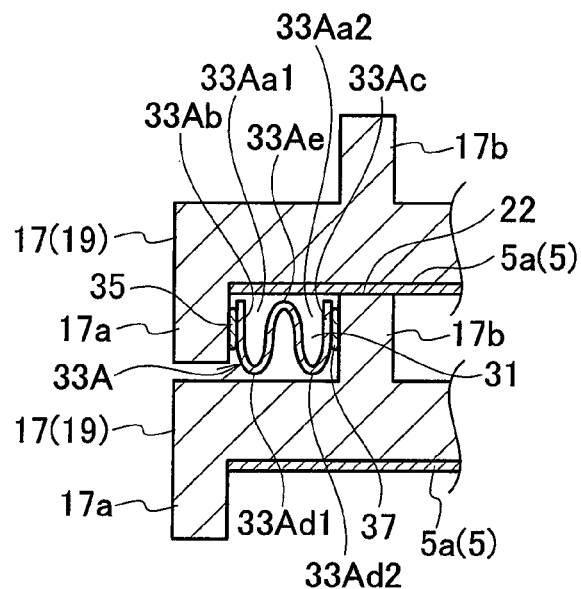
FIG. 4 is a cross-sectional view of a seal structure that uses an elastic member according to a second embodiment.

FIG. 4 shows an elastic member 33A according to a second embodiment. The elastic member 33A in FIG. 4 has an almost W-shape formed by jointing two U-shaped portions each of which is almost similar to the elastic member 33 in FIG. 3. Namely, the elastic member 33A includes an outer plate portion 33Ab and an inner plate portion 33Ac that press the left and right glass seals 35 and 37, respectively, an outer-side curved portion 33Ad1 continued from a lower end of the outer plate portion 33Ab, and an inner-side curved portion 33Ad2 continued from a lower end of the inner plate portion 33Ac.

Further, the elastic member 33A includes a reverse U-shaped portion 33Ae connecting the outer-side curved portion 33Ad1 and the inner-side curved portion 33Ad2. By including the reverse U-shaped portion 33Ae, an outer-side opened portion 33Aa1 on a side of the outer plate portion 33Ab and an inner-side opened portion 33Aa2 on a side of the inner plate portion 33Ac are formed. Structures of other portions are almost similar to those in FIG. 1. Note that, the shape in FIG. 4 is a shape formed by jointing two U-shaped portions of the elastic member 33 in FIG. 3, but may be a shape formed by jointing three or more.

Since the outer plate portion 33Ab and the inner plate portion 33Ac press the glass seals 35 and 37 in their compressive directions, respectively, also in the elastic member 33A in FIG. 4, they can be restricted from being damages and thereby reliability of their sealing function can be enhanced. Since an elastic force caused by the elastic member 33A can be enhanced by its W-shape on that occasion, it can cope with a case where large displacements of components of the fuel cell occur.

In addition, the elastic member 33A in FIG. 4 can bring similar effects brought by the elastic member 33 in FIG. 3, e.g. can apply compressive forces to the glass seals 35 and 37 just after being assembled by making an entire open width of combination of the outer-side opened portion 33Aa1 and the inner-side opened portion 33Aa2 before being assembled wider than after being assembled. The open width of the combination of the outer-side opened portion 33Aa1 and the inner-side opened portion 33Aa2 corresponds to a distance between the outer plate portion 33Ab and the inner plate portion 33Ac.

Further, when air in the air flow passages 25 flows out to a side of the space 31, a pressure of the air applies to the inside of the two U-shaped portions of the elastic member 33A similarly to the first embodiment, and thereby applies in directions so as to press the outer plate portion 33Ab and the inner plate portion 33Ac onto the glass seals 35 and 37, respectively. The pressure for pressing the glass seals 35 and 37 gets high, and thereby the seal performance improves further.

Figure 5:
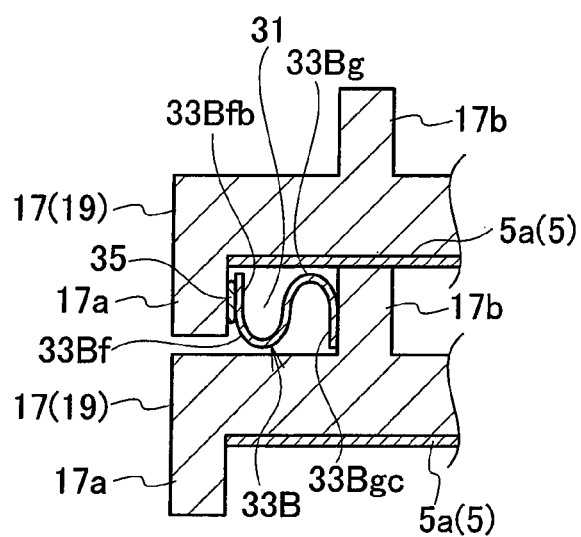
FIG. 5 is a cross-sectional view of a seal structure that uses an elastic member according to a third embodiment.

FIG. 5 shows an elastic member 33B according to a third embodiment. The elastic member 33B in FIG. 5 has a shape formed by jointing a U-shaped portion 33Bf almost similar to that of the elastic member 33 in FIG. 3 and a reverse U-shaped portion 33Bg. In this case, the elastic member 33B presses the glass seal by its outer plate portion 33Bfb of the U-shaped portion 33Bf. On the other hand, an inner plate portion 33Bgc of the reverse U-shaped portion 33Bg is fixed with the upper protruded portion 17b by welding.

In the elastic member 33B in FIG. 5, the outer plate portion 33Bfb presses the glass seal 35 in its compressive direction. Therefore, the glass seal 35 can be restricted from being damaged, and thereby reliability of its sealing function can be enhanced.

The reliability of the sealing function can be enhanced in a case where the elastic member 33B in FIG. 5 is used, because only one fragile glass seal, i.e. the glass seal 35 on the outer side, is needed. In addition, when air in the air flow passages 25 flows out to a side of the space 31, a pressure of the air applies to the inside of the U-shaped portion 33Bf of the elastic member 33B, and thereby applies in a direction so as to press the outer plate portion 33Bfb onto the glass seal 35. The pressure for pressing the glass seal 35 gets high, and thereby the seal performance improves further.

Figure 6:
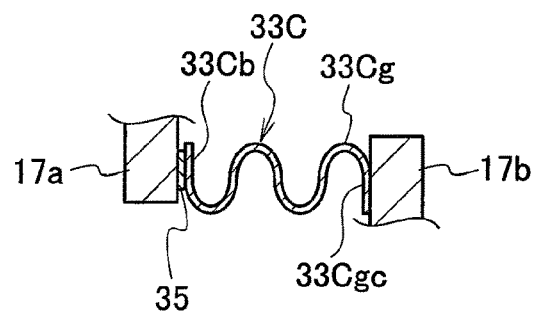
FIG. 6 is a cross-sectional view of a seal structure that uses an elastic member according to a fourth embodiment.

FIG. 6 shows an elastic member 33C according to a fourth embodiment. The elastic member 33C in FIG. 6 has a shape formed by jointing the elastic member 33A in FIG. 4 having a W-shape and a reverse U-shaped portion 33Cg like as that in the elastic member 33B in FIG. 5. In this case, an outer plate portion 33Cb presses the glass seal 35 in its compressive direction, and an inner plate portion 33Cgc of the reverse U-shaped portion 33Cg is fixed with the upper protruded portion 17b by welding.

The reliability of the sealing function can be enhanced in a case where the elastic member 33C in FIG. 5 is used, because only one fragile glass seal, i.e. the glass seal 35 on the outer side, is needed similarly to the elastic member 33B in FIG. 5. Since an elastic force caused by the elastic member 33C can be enhanced more in comparison with the elastic member 33B in FIG. 5, it can cope with a case where large displacements of components of the fuel cell occur.

Figure 7:
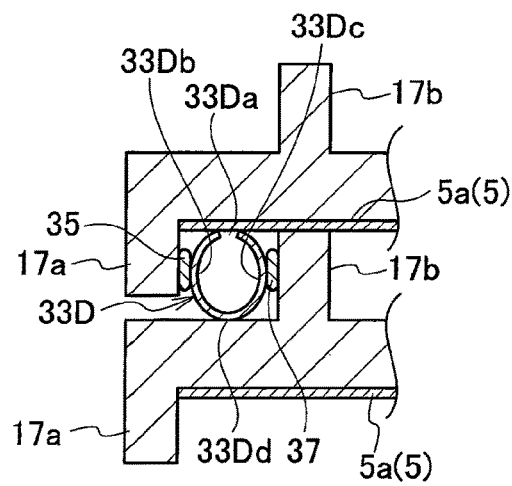
FIG. 7 is a cross-sectional view of a seal structure that uses an elastic member according to a fifth embodiment.

FIG. 7 shows an elastic member 33D according to a fifth embodiment. Although the elastic member 33 in FIG. 1 has a U-shape, the elastic member 33D in FIG. 7 has an almost ellipsoidal shape (or an almost O-shape). An entire of the ellipsoidal shape of the elastic member 33D elongates in the stacked direction of the cells 1 in a state where an opened portion 33Da is provided on its side contacting with the upper solid electrolyte 5 (the insulative layer 5a).

In this case, an outer plate portion 33Db and an inner plate portion 33Dc of the elastic member 33D are curved so that their almost center portions in a vertical direction in FIG. 7 between the support members 19 adjacent to each other are protruded toward the lower protruded portion 17a and the upper protruded portion 17b, respectively. The almost center curved portions of the outer plate portion 33Db and the inner plate portion 33Dc in the vertical direction contact with the glass seals 35 and 37, respectively.

The elastic member 33D is provided with an opened portion 33Da at its upper portion on an opposite side to its curved portion 33Dd at its lower portion in FIG. 7. An open width P, shown in FIG. 8(a), of the opened portion 33Da before being assembled is wider than an open width Q, shown in FIG. 8(b), of the opened portion 33Da after being assembled (P>Q).

Figure 8:
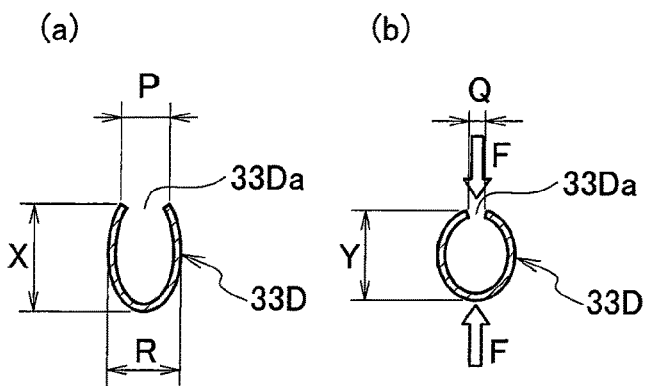
FIG. 8 shows a cross-sectional view of an elastic member, before being assembled, used in the seal structure shown in FIG. 7 as (a), and shows a cross-sectional view, after being assembled, as (b).

In the elastic member 33D before being assembled shown in FIG. 8(a), a distance R between mostly-protruded portions of the outer plate portion 33Db and the inner plate portion 33Dc in directions as being distanced away from each other is made wider than the open width P. Further, in the elastic member 33D, a height X before being assembled shown in FIG. 8(a) is made higher than a height Y after being assembled shown in FIG. 8(b) (X>Y).

Therefore, the elastic member 33D shown in FIG. 8(a) receives pressing forces F between the adjacent cells 1 as shown in FIG. 8(b) when being assembled in the fuel cell as shown in FIG. 7, and thereby compressively deforms so as to be crushed. When the elastic member 33D is compressed and then elastically deformed, the wide open width P of the opened portion 33Da turns to the narrow open width Q to bring the almost ellipsoidal shape elongating in the vertical direction.

In this state, the outer plate portion 33Db and the inner plate portion 33Dc press the glass seals 35 and 37 in their compressive directions due to a reactive force after being elastically deformed. Therefore, the glass seals 35 and 37 can be restricted from being damaged, and thereby reliability of their sealing function can be enhanced.

Note that the elastic member 33D may have, as a hole, an O-shape formed by jointing both ends, on a side where the opened portion 33Da is formed, of the outer plate portion 33Db and the inner plate portion 33Dc.

The embodiments of the present invention are described above, but these embodiments are mere examples described to make the present invention easily understood, and the present invention is not limited to the above embodiments. The technical scope of the present invention is not limited to specific technical matters disclosed in the above embodiments, and includes modifications, changes, alternative techniques easily derived from them.

For example, a part manufactured by press-forming a plate material is used as the elastic member in the above embodiments, but a compressed coil spring or a rubber may be used. Seal performance is exerted by pressing the left and right glass seals 35 and 37 shown in FIG. 1 by a compressed coil spring or a rubber.

INDUSTRIAL APPLICABILITY

The present invention is applied to a seal structure for a solid oxide fuel cell in which plural cells are stacked.

REFERENCE SIGNS LIST

1 cell
5 solid electrolyte (electrolyte)
7 fuel electrode
9 air electrode
13 support portion of support member
17 seal portion of seal member
19 support member
17*a* lower protruded portion (outer-side wall portion)
17*b* upper protruded portion (inner-side wall portion)
22 butting portion
33, 33A, 33B, 33C, 33D elastic member
33*a*, 33Da opened portion
33Aa1 outer-side opened portion
33Aa2 inner-side opened portion
33*b*, 33Ab, 33Bfb, 33Cb, 33Db outer plate portion of elastic member
33*c*, 33Ac, 33Bgc, 33Cgc, 33Dc inner plate portion of elastic member
33*d*, 33Dd curved portion of elastic member
33Ad1 outer-side curved portion of elastic member
33Ad2 inner-side curved portion of elastic member
35, 37 glass seal (seal member)

The invention claimed is:

1. A seal structure for a fuel cell in which a plurality of cells are stacked, each cell including an electrolyte, a fuel electrode, an air electrode and a support member,
wherein the support member includes a support portion configured to support an electric power generation portion of the cell and a seal portion that is located outside the electric power generation portion and configured to seal between cells adjacent to each other, and
wherein the seal structure comprises
an outer-side wall portion and an inner-side wall portion that are located between seal portions adjacent to each other, the outer-side wall portion protruding from one of the seal portions toward another of the seal portions and located on a side of an outer circumference of the one of the seal portions, and the inner-side wall portion protruding from the another of the seal portions toward the one of the seal portions and located on the another of the seal portions and on a side closer to the electric power generation portion than the outer-side wall portion;
an elastic member that is provided between the outer-side wall portion and the inner-side wall portion, and configured to press the inner-side and outer-side wall portions in directions as being distanced away from each other; and
a seal member that is provided between at least one of the outer-side wall portion and the elastic member, or the inner-side wall portion and the elastic member.

2. The seal structure for a fuel cell according to claim 1, wherein
the elastic member is configured of a plate material, and includes an outer plate portion configured to press the outer-side wall portion, an inner plate portion configured to press the inner-side wall portion, and a curved portion configured to connect the outer plate portion and the inner plate portion.

3. The seal structure for a fuel cell according to claim 2, wherein
an opened portion formed on an opposite side to the curved portion in the elastic member is located on a same side in a stacking direction of the cells as a side of a butting portion where support members are butted with each other.

4. The seal structure for a fuel cell according to claim 2, wherein
portions of the outer plate portion and the inner plate portion of the elastic member that are located at a center between the seal portions of support members adjacent to each other are curved as protruding toward the outer-side wall portion and the inner-side wall portion, respectively.

5. The seal structure for a fuel cell according to claim 1, wherein the seal member is provided between the outer-side wall portion and the elastic member, and
wherein a seal member is provided between the inner-side wall portion and the elastic member.

6. A seal structure for a fuel cell in which a plurality of cells are stacked, each cell including an electrolyte, a fuel electrode, an air electrode and a support member,
wherein the support member includes a support portion configured to support an electric power generation portion of the cell and a seal portion that is located outside the electric power generation portion and configured to seal between cells adjacent to each other,
wherein the seal structure comprises
an outer-side wall portion and an inner-side wall portion that are located between adjacent seal portions, the outer-side wall portion being located on a side of an outer circumference of one of the seal portions, and the inner-side wall portion being located on another of the seal portions on a side closer to the electric power generation portion than the outer-side wall portion;
an elastic member that is provided between the outer-side wall portion and the inner-side wall portion, and configured to press both the outer-side wall portion and the inner-side wall portion in opposing directions; and
a seal member that is provided between at least one of the outer-side wall portion and the elastic member, or the inner-side wall portion and the elastic member,
wherein the elastic member is comprised of a plate material, and includes an outer plate portion configured to press the outer-side wall portion, an inner plate portion configured to press the inner-side wall portion, and a curved portion configured to connect the outer plate portion and the inner plate portion, and
wherein an opened portion formed on an opposite side to the curved portion in the elastic member is located on a same side in a stacking direction of the cells as a side of a butting portion where support members are butted with each other.

7. A fuel cell comprising:

a plurality of cells stacked therein, each cell including an electrolyte, a fuel electrode, an air electrode and a support member, wherein the support member of each of the cells includes a support portion configured to support an electric power generation portion of a respective cell and a seal portion that is located outside the electric power generation portion and configured to seal between adjacent cells, the seal portion having an outer-side wall portion protruding from a first surface thereof and an inner-side wall portion protruding from a second surface thereof opposite to the first surface, the inner-side wall portion being located closer to the electric power generation portion than the outer-side wall portion, wherein an elastic member is provided between the outer-side wall portion of a first cell and the inner-side wall portion of a second cell adjacent to the first cell, the elastic member being configured to press both the outer-side wall portion of the first cell and the inner-side wall portion of the second cell in opposing directions, and wherein a seal member is provided between at least one of the outer-side wall portion of the first cell and the elastic member, or the inner-side wall portion of the second cell and the elastic member.

\* \* \* \* \*